(12) United States Patent
Kakimoto et al.

(10) Patent No.: US 7,666,101 B2
(45) Date of Patent: Feb. 23, 2010

(54) YOKE FOR UNIVERSAL JOINT

(75) Inventors: Kazuhide Kakimoto, Osaka (JP);
Hisatsugu Kawai, Osaka (JP); Akio Kobayashi, Osaka (JP); Takeshi Koyama, Osaka (JP)

(73) Assignee: KOYO Machine Industries Co., Ltd., Yao-shi, Osaka (JP)

( * ) Notice: Subject to any disclaimer, the term of this patent is extended or adjusted under 35 U.S.C. 154(b) by 362 days.

(21) Appl. No.: 11/637,152

(22) Filed: Dec. 12, 2006

(65) Prior Publication Data

US 2008/0015036 A1    Jan. 17, 2008

(30) Foreign Application Priority Data

Dec. 16, 2005    (JP)    ............................ P2005-362772

(51) Int. Cl.
*F16D 3/16*    (2006.01)

(52) U.S. Cl. ...................... 464/134; 403/236

(58) Field of Classification Search .................. 464/134, 464/135, 182; 403/235, 236, 290, 318, 319, 403/398

See application file for complete search history.

(56) References Cited

U.S. PATENT DOCUMENTS

| 3,016,253 | A | * | 1/1962 | Launder ...................... 403/398 |
| 4,361,024 | A | * | 11/1982 | Haldric ................... 403/290 X |
| 5,628,578 | A | * | 5/1997 | McClanahan et al. ....... 403/290 |
| 6,270,418 | B1 | * | 8/2001 | Oka et al. ............... 403/290 X |
| 2005/0282641 | A1 | * | 12/2005 | Sadakata et al. ............ 464/134 |

FOREIGN PATENT DOCUMENTS

| GB | 496969 | * 12/1938 | ................. 403/290 |
| JP | 10-9281 | 1/1998 | |

* cited by examiner

*Primary Examiner*—Greg Binda
(74) *Attorney, Agent, or Firm*—McGinn IP Law Group, PLLC (57) ABSTRACT

A yoke for universal joint includes a base portion and a pair of opposed side walls and is connected to one end of a rotating shaft having two planes parallel to each other. One end of the rotating shaft is inserted between the opposed side walls such that both planes oppose the respective opposed side walls and the lower surface is abutted on the base portion. Then, a fastening portion of the opposed side walls in the upper portions thereof is fastened by a bolt such that the rotating shaft is interposed and fixed. On the inner surfaces of the opposed side walls, the concave portion is formed under the fastening portion. The concave portion is pushed against the outer peripheral square portion of the rotating shaft in both sides of the fastening portion in the axial direction of the rotating shaft.

19 Claims, 6 Drawing Sheets

YOKE FOR UNIVERSAL JOINT

BACKGROUND OF THE INVENTION

The present invention relates to a yoke for universal joint including a base portion and a pair of opposed side walls which extend from the base portion so as to face each other at a distance. In the yoke, one end of a rotating shaft inserted between the opposed side walls is interposed and fixed by the base portion and the opposed side walls when fastening portions of the opposed side walls at the leading ends thereof are fastened by a fastener.

Figure 8:
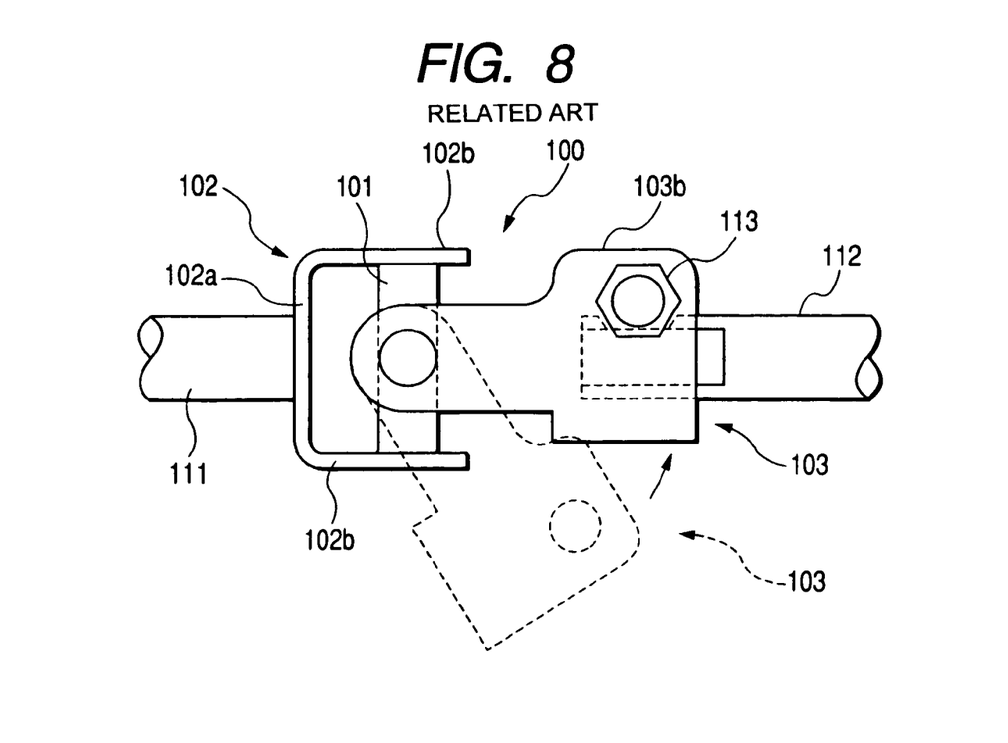
FIG. 8 is a side view illustrating a schematic construction of a universal joint.

A universal joint 100 serves to connect two shafts, of which the shaft lines intersect at a certain angle, so as to transmit the torque of one shaft to the other shaft. As shown in FIG. 8, the universal joint 100 includes a cross joint 101, of which the shaft lines cross each other, and two yokes 102 and 103 (a first yoke 102 and a second yoke 103), which are respectively connected to both ends of the shafts composing the joint cross 101 so as to rock around the shaft lines and to which one ends of rotating shafts 111 and 112 are respectively connected. The universal joint 100 is provided in a steering device of a vehicle, for example (refer to JP-A-10-9281).

The steering device transmits the torque of a steering shaft 111 to an input shaft 112 of a steering gear through the universal joint 100, and the steering shaft 111 is rotated by the manipulation of steering wheel, so that the steering device imparts a steering angle to a front wheel.

The first yoke 102 includes a base portion 102a and a pair of opposed side walls 102b which extend from the base portion 102a so as to face each other at a distance. One end of the steering shaft 111 is fixed to the outer surface of the base portion 102a, and the joint cross 101 is attached on the inner surfaces of the opposed side walls 102b at the leading ends thereof.

Figure 9:
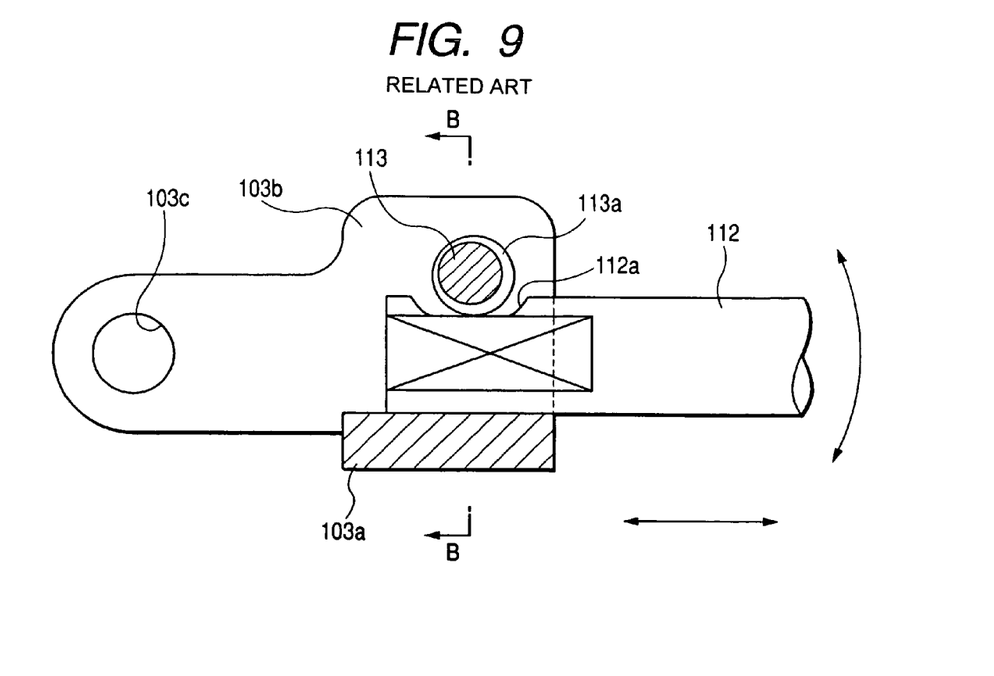
FIG. 9 is a cross-sectional view illustrating a schematic construction of a conventional yoke for universal joint.
Figure 10:
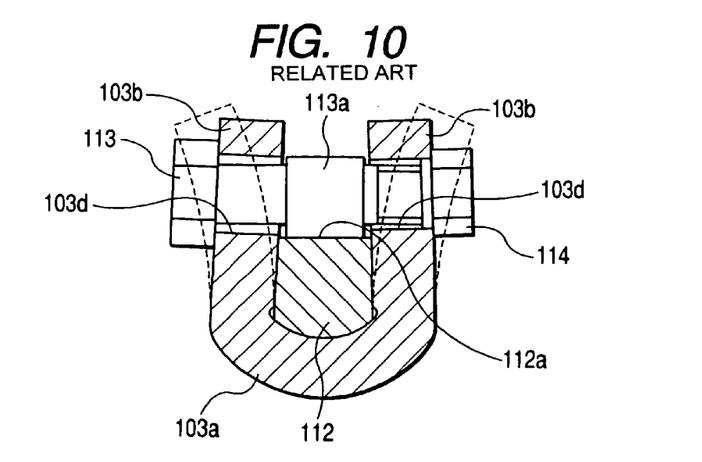
FIG. 10 is a cross-sectional view taken along line B-B of FIG. 9.

As shown in FIGS. 8 to 10, the second yoke 103 includes a base portion 103a and a pair of opposed side walls 103b which extend from the base portion 103a so as to face each other at a distance, similar to the first yoke 102. The base portion 103a is formed only in a base part of the opposed side walls 103b at one end, and the respective opposed side walls 103b are formed so that the space between the opposed side walls 103b is widened from the base part to the leading end, as shown by a chain double-dashed line of FIG. 10. Further, in the respective opposed side walls 103b, an attachment hole 103c to which the joint cross 101 is attached is formed in the other end thereof, and a through-hole 103d is formed in the one end and the leading end thereof.

One end of the input shaft 112 of the steering gear is connected to the second yoke 103. Specifically, one end of the input shaft 112 is inserted between the opposed side walls 103b such that the second yoke 103 rocks around the axis line of the joint cross 101, and the outer periphery of the input shaft 112 is abutted on the inner surface of the base portion 103a. Then, when the leading ends of the opposed side walls are fastened by a bolt 113 having an eccentric shaft 113a and a nut 114, the input shaft 112 is interposed by the base portion 103a and the opposed side walls 103b, and the outer periphery of the input shaft 112 opposite to the base portion 103a (the bottom surface of a notched portion 112a to be described) is pressed by the eccentric shaft 113a of the bolt 113. Accordingly, the second yoke 103 and the input shaft 112 are coupled and fixed to each other.

The one end of the input shaft 112 is formed on a plane such that the opposing surfaces (two planes) with respect to the opposed side walls 103b are parallel to each other. On the surface of the input shaft 112 opposite to the base portion 103a, a notched portion 112a is formed so as to avoid the interference with the bolt 113 and to prevent the input shaft 112 from coming off from the second yoke 103 when the input shaft 112 moves in the shaft line direction. Further, the intersection portion between the bottom surface of the notched portion 112a and the surface opposed to the side wall 10b is formed in a square shape (square corner).

Patent Document 1: JP-A-10-9281

However, although the input shaft 112 is pushed against the inner surface of the base portion 103a by the eccentric shaft 113a of the bolt 113 in the coupling between the second yoke 103 and the input shaft 112 of the steering gear, a deviation into the rotation direction centered on the pressed portion of the input shaft 112 by the bolt 113 or a deviation into the axial direction of the input shaft 112 (refer to a direction of an arrow of FIG. 9) occurs between the second yoke 103 and the input shaft 112 due to an external force or vibration acting on the second yoke 103 and the input shaft 112. Such a deviation results in noise and makes the transmission of torque incomplete.

SUMMARY OF THE INVENTION

The invention has been made to solve the above-mentioned problem, and an advantage of the present invention is provide to a yoke for universal joint which can remove a deviation with respect to a rotating shaft.

According to the invention, a yoke for universal joint, to which one end of a rotating shaft having two planes parallel to each other is connected, includes a base portion and a pair of opposed side walls that extend from the base portion so as to face each other at a distance. The one end of the rotating shaft is inserted between the opposed side walls such that both planes of the rotating shaft at the one end are opposed to the opposed side walls and the outer periphery of the rotating shaft at the one end is abutted on the base portion. The inserted rotating shaft is interposed and fixed by the base portion and the opposed side walls when fastening portions of the opposed side walls at the leading ends thereof are fastened by a fastener. A concave portion is formed in a portion, which is abutted on an outer peripheral square portion of the rotating shaft at the one end, between the fastening portion and the base portion in one or both inner surfaces of the opposed side walls. An opening peripheral edge square portion of the concave portion is pushed against the outer peripheral square portion of the rotating shaft in both sides of the fastening portions in the axial direction of the rotating shaft by the fastening of the fastener.

In accordance with the invention, one end of the rotating shaft is inserted between the opposed side walls such that two planes thereof are opposed to the inner surfaces of the respective opposed side walls and the outer periphery thereof is abutted on the inner surface of the base portion, and the fastening portion of the opposed side walls at the leading end is fastened by the fastener. Then, the one end of the rotating shaft is interposed by the base portion and the opposed side walls, and the yoke and the rotating shaft are coupled and fixed to each other.

At this time, the leading ends of the opposed side walls are deformed by the fastening of the fastener such that the opposed side walls approach each other. By the deformation of the opposed side walls, the opening peripheral square portion of the concave portion is pushed against the outer peripheral square portion of the rotating shaft, and one of the opening peripheral edge square portion and the outer peripheral square portion bites the other in both sides of the fastening portion in the axial direction of the rotating shaft.

Accordingly, the rotating shaft can be pressed at two positions with the fastening portion interposed therebetween. Further, when the yoke and the rotating shaft are relatively rotated around the axis parallel to the opposed direction of the opposed side walls or are relatively moved in the axial direction of the rotating shaft due to an external force or vibration acting on the yoke and the rotating shaft, the positional relationship between the yoke and the rotating shaft is prevented from being deviated.

According to the yoke for universal joint of the invention, the rotating shaft is not only interposed by the base portion and the opposed side walls through the fastening of the fastener, but also one of the opening peripheral edge square portion of the concave portion and the outer peripheral square portion of the rotating shaft bites the other in both sides of the fastening portion. Therefore, the yoke and the rotating shaft can be more reliably coupled and fixed to each other. Accordingly, without a deviation occurring between the yoke and the rotating shaft, noise can be prevented from occurring, and the transmission of torque can be prevented from being incomplete.

Preferably, the concave portion is both of the opposed side walls, not in one of them. Then, it is possible to implement a coupling structure with no rattling.

The yoke for universal joint may be formed of a material having lower hardness than the rotating shaft. In this case, the outer peripheral square portion of the rotating shaft can bites the opening peripheral square portion of the concave portion. Further, in the yoke for universal joint, at least the base portion, the opposed side walls, and the concave portion may be molded by a pressing process. In this case, it is possible to form the concave portion at a lower cost than when it is formed by a cutting process.

According to the above-described yoke for universal joint of the present invention, the concave portion is provided on the inner surfaces of the opposed side walls, and one of the opening peripheral edge square portion of the concave portion and the outer peripheral square portion of the rotating shaft bites the other. Therefore, the coupling structure between the yoke and the rotating shaft can be strengthened, and a deviation occurring between the yoke and the rotating shaft can be removed.

DETAILED DESCRIPTION OF PREFERRED EMBODIMENTS

Figure 1:
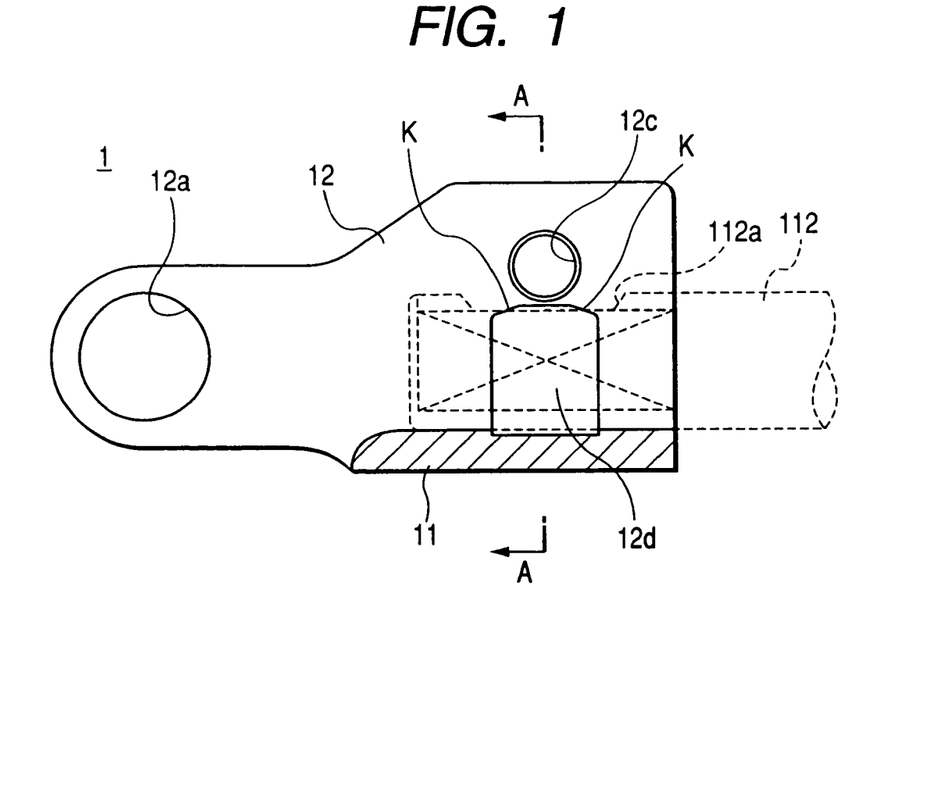
FIG. 1 is a cross-sectional view illustrating a schematic construction of a yoke for universal joint according to an embodiment of the present invention.
Figure 2:
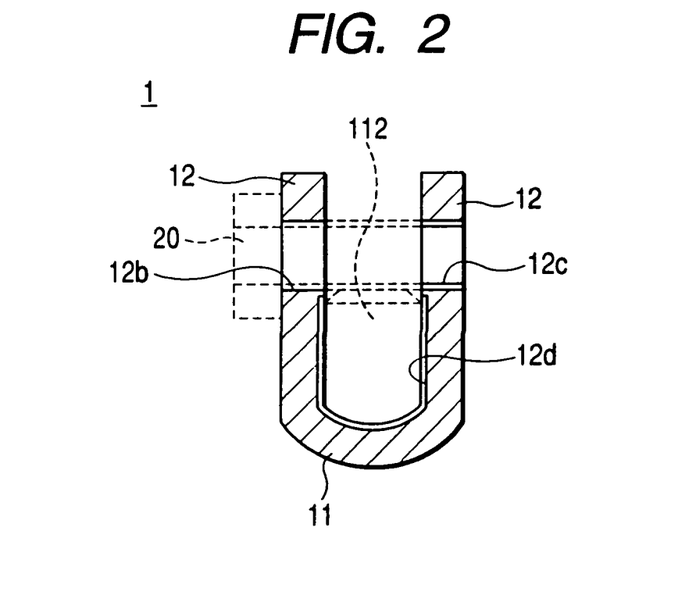
FIG. 2 is a cross-sectional view taken along A-A line of FIG. 1.

Hereinafter, a preferred embodiment of the present invention will be described with reference to accompanying drawings. FIG. 1 is a cross-sectional view illustrating a schematic construction of a yoke for universal joint according to an embodiment of the invention, and FIG. 2 is a cross-sectional view taken along line A-A of FIG. 1. In the following descriptions, the yoke 1 for universal joint of this embodiment shown in FIGS. 1 and 2 will be provided in place of the second yoke 103 shown in FIGS. 8 to 10. In the descriptions excluding the yoke 1, the same reference numerals will be attached, and the detailed descriptions thereof will be omitted.

The yoke 1 for universal joint (the second yoke) of this embodiment is formed of a material having lower hardness than the input shaft 112 of the steering gear. As shown in FIGS. 1 and 2, the yoke 1 for universal joint includes a base portion 11 and a pair of opposed side walls 12 which extend upward from the base portion 11 so as to face each other at a distance. Further, the yoke 1 has a U-shaped cross-section.

The base portion 11 is formed only in a base part of the respective opposed side walls 12 at one ends thereof in the axial direction of the input shaft 112. Each of the opposed side walls 12 has an attachment hole 12a to which a joint cross 101 is attached, and the attachment hole 12 is provided in the other end. Further, one of the opposed side walls 12 has a through-hole 12b, and the other of the opposed side walls 12 has a screw hole 12c. The attachment holes 12a of the opposed side walls 12 are coaxial to each other. The through-hole 12b and the screw hole 12c are formed in the one end of the opposed side wall 12 and more upward than the upper surface of the input shaft 112 (the bottom surface of a notched portion 112a). The through-hole 12b and the screw hole 12c are coaxial to each other.

On each of the inner surfaces of the opposed side walls 12 and the inner surface of the base portion 11, a concave portion 12d is integrally formed. The concave portions 12d are respectively provided under the through hole 12b and the screw hole 12c and are provided so as to be symmetric with respect to a vertical plane passing through the center axis line of the through hole 12b and the screw hole 12c. The depth of the concave portion 12d is set to about 0.5 mm and the peripheral edge of the opening thereof is formed in a square shape.

As for the height position of the side surface of the concave portion 12d in the upper portions of the opposed side walls, the concave portion 12d at opposite end sides are set to be lower than the upper surface (the bottom surface of the notched portion 112a) of the input shaft 112. A portion of the concave portion 12d from opposite end sides to the center portion gently and continuously increases in height, and the center portion is set to be higher than the bottom surface of the notched portion 112a.

The second yoke 1 can be made by subjecting a plate-shaped material to a pressing process such as cold pressing or heat pressing to form the base portion 11, the opposed side walls 12, and the concave portion 12d and then forming the attachment hole 12a, the through-hole 12b, and the screw hole 12c by a cutting process.

In the second yoke 1 having the above structure, the second yoke 1 is rocked around the axis line of the joint cross 101, and one end of the input shaft 112 is inserted between the opposed side walls 12 such that the respective opposing surfaces thereof oppose the inner surfaces of the opposed side walls 12 and the circular-arc-shaped lower surface thereof is abutted on the circular-arc-shaped inner surface of the base portion 11. Then, a bolt (fastener) 20 is inserted into the through-hole 12b from the outer surface of one of the opposed side walls 12 so as to be screwed to the screw hole 12c. When fastening portions in the upper portions of the opposed side walls 12 are fastened by the bolt 20, the one end of the input shaft 112 is interposed and held by the base portion 11 and the opposed side walls 12, and the yoke 1 and the input shaft 112 are coupled and fixed to each other.

Figure 3:
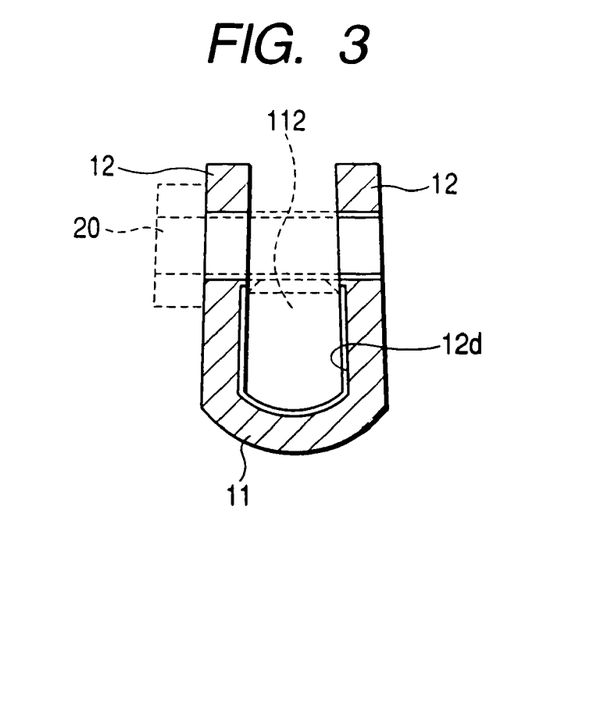
FIG. 3 is a cross-sectional view showing a state where the yoke is deformed when opposed side walls are fastened.

At this time, the upper portions of the opposed sided walls 12 are deformed by the fastening of the bolt 20 such that the opposed side walls 12 approach each other, as shown in FIG. 3. By the deformation of the opposed walls 12, the opening peripheral edge square portion of the concave portion 12d is pushed against the outer peripheral square portion (intersection portion between the bottom surface of the notched portion 112a and the opposing surface) of the input shaft 112 in both sides of the fastening portions in the axial direction of the input shaft 112. Then, the outer peripheral square portion of the input shaft 112 bites the opening peripheral edge portion of the concave portion 12d. Further, a portion indicated by reference numeral K of FIG. 1 is a bite portion.

As such, with the outer peripheral square portion of the input shaft 112 biting the opening peripheral edge portion of the concave portion 12d in both sides of the fastening portions in the axial direction of the input shaft 112, the input shaft 112 can be pressed at two positions in the left and right sides with respect to the vertical plane passing through the center axis line of the through hole 12b and the screw hole 12c. The yoke 1 and the input shaft 112 are not relatively rotated around the axis parallel to the opposed direction of the opposed side walls 12 and are not relatively moved in the axial direction of the input shaft 112 due to an external force and vibration acting on the yoke 1 and the input shaft 112. Therefore, the positional relationship between both the yoke 1 and the input shaft 112 can be prevented from being deviated.

According to the second yoke 1 of this embodiment, the input shaft 112 is not only interposed and held by the base portion 11 and the opposed side walls 12 through the fastening of the bolt 20, but also the outer peripheral square portion of the input shaft 112 bites the opening peripheral edge square portion of the concave portion 12d in both sides of the fastening portion. Therefore, the yoke 1 and the input shaft 112 can be strongly coupled and fixed to each other. Accordingly, without any deviation occurring between the yoke 1 and the input shaft 112, noise does not occur, and the transmission of torque can be prevented from being performed incompletely.

The concave portions 12d are formed in both of the opposed side walls 12 and imparts a coupling structure with no rattling. Because the concave portion 12d is formed by a pressing process, the concave portion 12d can be formed at a lower cost than when it is formed by a cutting process.

Although one embodiment of the invention has been described so far, a specific adoptable embodiment of the invention is not limited thereto.

In the above-described embodiment, as for the shape of the concave portion 12d, of which the opening peripheral edge square portion is pushed against the outer peripheral square portion of the input shaft 112 when the opposed side walls 12 are fastened by the bolt 20, such a shape as shown in FIGS. 1 and 2 has been exemplified. However, the concave portion 12d may be formed in any shape, as long as the opening outer peripheral square portion thereof can be pushed against the outer peripheral square portion of the input shaft 112 at two positions in the left and right sides with respect to the vertical plane passing through the center shaft line of the through-hole 12b and the screw hole 12c by the fastening of the bolt 20. For example, the concave portion may be formed in the shape shown in FIGS. 4 to 7.

Figure 4:
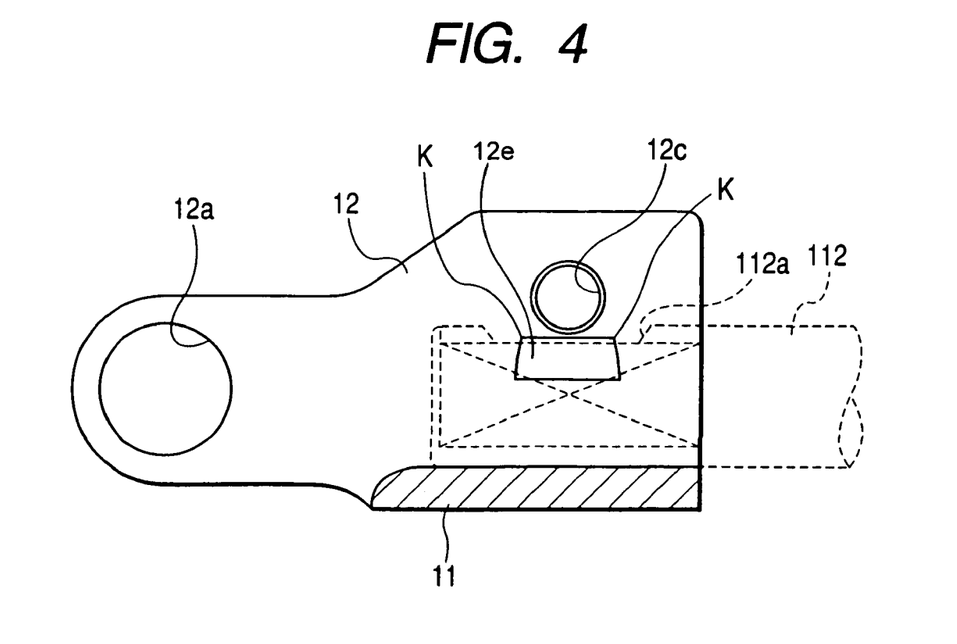
FIG. 4 is a cross-sectional view illustrating a modification of a concave portion.
Figure 11:
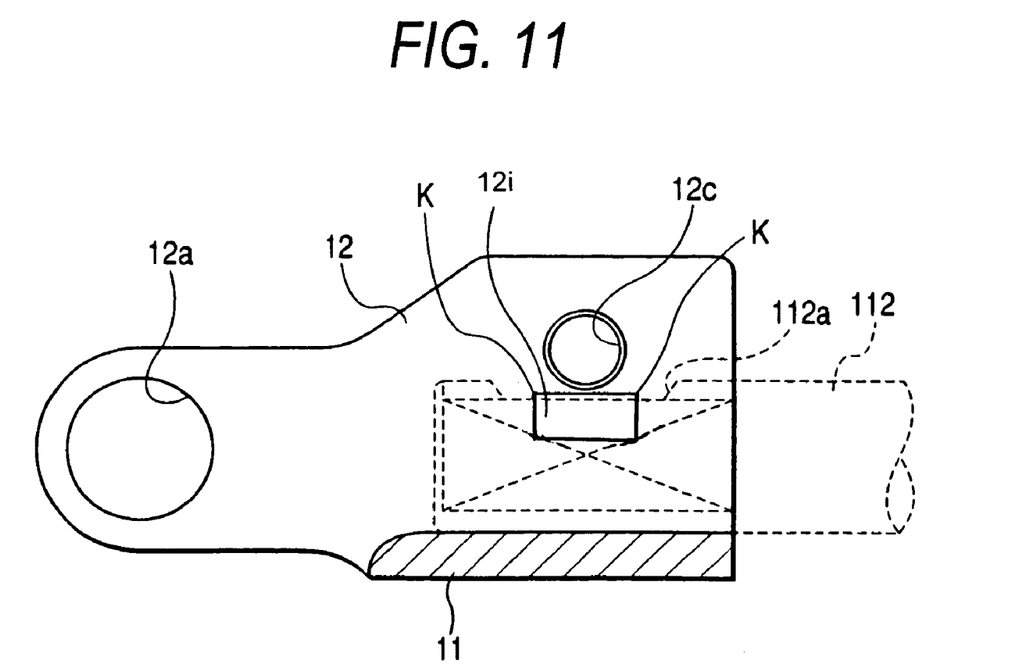
FIG. 11 is a cross-sectional view illustrating an additional modification of the concave portion.

In the yoke shown in FIG. 4, the concave portion 12e is formed in a trapezoid shape and is provided on a portion on which the outer peripheral square portion of the input shaft 112 is abutted so as to be symmetrical with respect to the vertical plane passing through the center axis line of the through-hole 12b and the screw hole 12c. Further, the side surfaces of the concave portion 12e in the upper portions of the opposed side walls are formed in a slightly higher position than the bottom surface of the notched portion 112a. In this case, the upper side thereof may be longer or shorter than the lower side thereof. Further, in the yoke shown in FIG. 11, the concave portion 12i may be formed in a rectangle shape of which the upper and lower sides are identical to each other.

Figure 5:
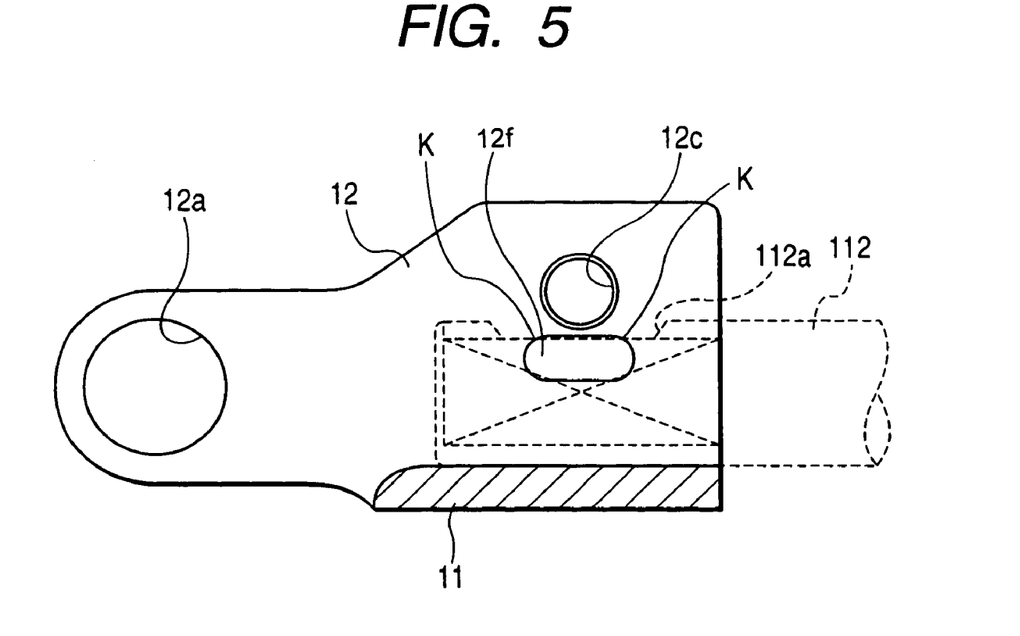
FIG. 5 is a cross-sectional view illustrating another modification of the concave portion.

In the yoke shown in FIG. 5, the concave portion 12f is formed in an elongate-hole shape and is provided on a portion thereof, on which the outer peripheral square portion of the input shaft 112 is abutted, so as to be symmetrical with respect to the vertical plane passing through the center axis line of the through-hole 12b and the screw hole 12c. Further, the side surfaces of the concave portion 12f in the upper portions of the opposed side walls are formed in a slightly higher position at the central portion thereof than the bottom surface of the notched portion 112a.

Figure 6:
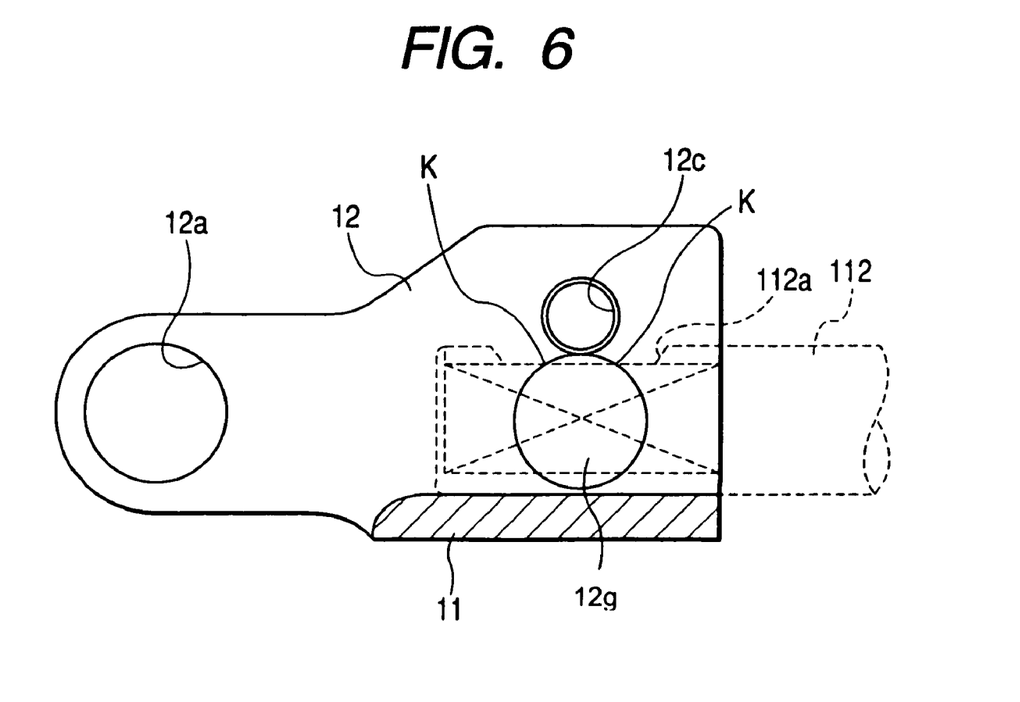
FIG. 6 is a cross-sectional view illustrating a further modification of the concave portion.

In the yoke shown in FIG. 6, the concave portion 12g is formed in a circular-hole shape and is provided on a portion thereof, on which the outer peripheral square portion of the input shaft 112 is abutted, so as to be symmetrical with respect to the vertical plane passing through the center axis line of the through-hole 12b and the screw hole 12c. Further, the side surfaces of the concave portion 12g in the upper portions of the opposed side walls are formed in a slightly higher position than the bottom surface of the notched portion 112a.

Figure 7:
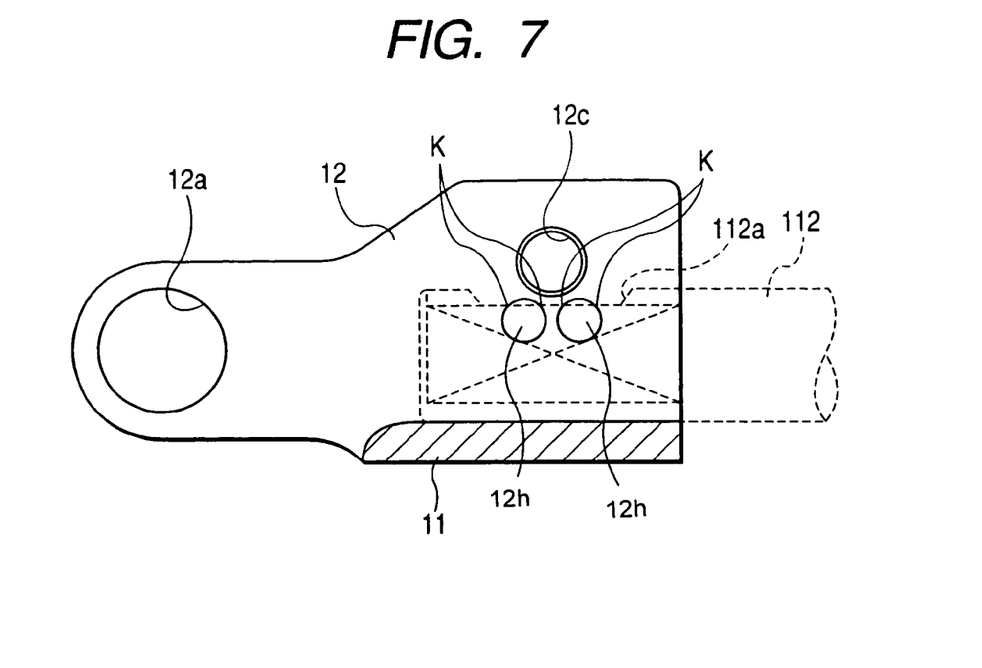
FIG. 7 is a cross-sectional view illustrating a still further modification of the concave portion.

In the yoke shown in FIG. 7, the two concave portions 12h formed in a circular-hole shape are provided on a portion on which the outer peripheral square portion of the input shaft 112 is abutted, and are provided so as to be symmetric to each other with respect to the vertical plane passing through the center axis line of the through-hole 12b and the screw hole 12c. Further, the side surfaces of the concave portion 12h in the upper portions of the opposed side walls are formed in a slightly higher position than the bottom surface of the notched portion 112a.

Each of the concave portions 12d, 12e, 12f, 12g, 12h, 12i respectively shown in FIGS. 4 to 7 and FIG. 11 may be formed on only one of the inner surfaces of the opposed walls 12 or both of them. Further, the portion indicated by reference numeral K shown in FIGS. 4 to 7 and FIG. 11 is where the square portion of the input shaft 112 bites the opening peripheral edge portion of the concave portions 12d, 12e, 12f, 12g, 12h, 12i when the opening peripheral edge portion of the concave portions 12d, 12e, 12f, 12g, 12h, 12i is pushed against the outer peripheral square portion of the input shaft 112.

In the above-described embodiment, the second yoke 1 is formed of a material having a lower hardness than the input shaft 112, and the outer peripheral square portion of the input shaft 112 bites the opening peripheral edge square portion of the concave portion 12d. However, the second yoke 1 may be formed of a material having a higher hardness than the input shaft 112, and the opening peripheral edge square portion of the concave portion 12d may bites the outer peripheral square portion of the input shaft 112.

In the above-described embodiment, the bolt 20 shown in FIGS. 1 and 2 is used for the fastening of the opposed side walls 12. As shown in FIGS. 9 and 10, however, a bolt 113 having an eccentric shaft 113a may be used, and the fastening structure is not limited.

Further, the shape of the input shaft (rotating shaft) 112 coupled and fixed to the second yoke 1 is not limited to that of the input shaft 112 shown in FIGS. 1, 2, 8, 9, and 10. The input shaft 112 may be formed in any shape if the opposing surfaces thereof with respect to the opposed side walls 12 are respectively formed with a plane and the intersection portion between the opposing surfaces and the outer periphery of the input shaft 112 opposite to the based portion 11 is formed in a square shape.

What is claimed is:

1. A yoke for a universal joint to which one end of a rotating shaft having two planes parallel to each other is connected, the yoke comprising:
    a base portion;
    a pair of opposed side walls that extend from the base portion such that the pair of opposed side walls faces each other at a distance;
    a pair of fastening portions respectively formed on the pair of opposed side walls, the pair of fastening portions being fastened by a fastener such that the rotating shaft is held, the rotating shaft being held such that the two planes of the rotating shaft are respectively opposed to and held by the pair of opposed side walls and an outer periphery of the rotating shaft is abutted on the base portion; and
    at least one concave portion formed in a portion of an inner surface of the pair of opposed side walls between the fastening portions and the base portion, the at least one concave portion comprising an opening peripheral edge portion pushed against an outer peripheral square portion of the rotating shaft in opposite sides of the pair of fastening portions in an axial direction of the rotating shaft when the rotating shaft is held by the pair of opposed side walls,
    wherein one of the opening peripheral edge portion and the outer peripheral square portion bites another one thereof in the opposite sides of the pair of fastening portions in the axial direction of the rotating shaft.

2. The yoke according to claim 1, wherein the yoke comprises a material having a hardness which is less than a hardness of a material of the rotating shaft.

3. The yoke according to claim 1, wherein at least the base portion, the pair of opposed side walls, and the at least one concave portion are formed by a pressing process.

4. The yoke according to claim 1, wherein the at least one concave portion is formed on the inner surface of the pair of opposed side walls, respectively.

5. The yoke according to claim 1, wherein the at least one concave portion has a symmetrical shape with respect to a vertical plane passing through a center axis line of the pair of fastening portions.

6. The yoke according to claim 1, wherein the at least one concave portion has a trapezoid shape.

7. The yoke according to claim 1, wherein the at least one concave portion has a rectangular shape.

8. The yoke according to claim 1, wherein the at least one concave portion has an elongate-hole shape.

9. The yoke according to claim 1, wherein the at least one concave portion has a circular shape.

10. The yoke according to claim 1, wherein two concave portions having a circular-hole shape are formed on the portion of the inner surface such that the two concave portions are symmetric to each other with respect to a vertical plane passing through a center axis line of the pair of fastening portions.

11. The yoke according to claim 1, wherein the opening peripheral edge portion of the at least one concave portion further comprises a bite portion formed above the rotating shaft.

12. The yoke according to claim 1, wherein a notched portion is formed on an upper surface of the rotating shaft, the notched portion having a bottom surface disposed on the upper surface of the rotating shaft, and
    wherein the outer peripheral square portion comprises an intersection portion between the bottom surface of the notched portion and the upper surface of the rotating shaft.

13. The yoke according to claim 12, wherein the at least one concave portion further comprises side surfaces that are disposed lower than the bottom surface of the notched portion.

14. The yoke according to claim 13, wherein the at least one concave portion further comprises:
    a center portion disposed higher than the bottom surface of the notched portion, and
    an increasing portion disposed between the side surfaces and the center portion, said increasing portion gently and continuously increasing in height from the side surfaces to the center portion.

15. The yoke according to claim 12, wherein the at least one concave portion further comprises a center portion disposed higher than the bottom surface of the notched portion.

16. The yoke according to claim 12, wherein the at least one concave portion further comprises side surfaces that are, at upper portions of the pair of opposed side walls, disposed higher than the bottom surface of the notched portion.

17. The yoke according to claim 12, wherein the at least one concave portion further comprises side surfaces having central portions that are, at upper portions of the pair of opposed side walls, disposed higher than the bottom surface of the notched portion.

18. A yoke for a universal joint to which one end of a rotating shaft having two planes parallel to each other is connected, the yoke comprising:
    a base portion;
    a pair of opposed side walls that extend from the base portion such that the pair of opposed side walls faces each other at a distance;
    a pair of fastening portions respectively formed on the pair of opposed side walls, the pair of fastening portions being fastened by a fastener such that the rotating shaft is held, the rotating shaft being held such that the two planes of the rotating shaft are respectively opposed to and held by the pair of opposed side walls and an outer periphery of the rotating shaft is abutted on the base portion; and
    a concave portion formed in a portion of an inner surface of the pair of opposed side walls between the fastening portions and the base portion, the concave portion comprising an opening peripheral edge square portion pushed against an outer peripheral square portion of the rotating shaft in opposite sides of the pair of fastening portions in an axial direction of the rotating shaft when the rotating shaft is held by the pair of opposed side walls,
    wherein one of the opening peripheral edge square portion and the outer peripheral square portion bites another one thereof in the opposite sides of the pair of fastening portions in the axial direction of the rotating shaft.

19. The yoke according to claim 18, wherein the opening peripheral square edge portion of the concave portion comprises a bite potion formed above the rotating shaft.

* * * * *